United States Patent
Wu et al.

(10) Patent No.: US 7,047,494 B2
(45) Date of Patent: May 16, 2006

(54) SCALABLE VIDEO SUMMARIZATION

(75) Inventors: Peng Wu, Mountain View, CA (US); Ying Li, Los Angeles, CA (US); Daniel Tretter, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 609 days.

(21) Appl. No.: 10/140,794

(22) Filed: May 7, 2002

(65) Prior Publication Data
US 2003/0210261 A1 Nov. 13, 2003

(51) Int. Cl.
*G06F 13/00* (2006.01)
(52) U.S. Cl. .................... 715/723; 715/719
(58) Field of Classification Search ........... 715/723, 715/716, 726, 500.1, 764, 719, 722
See application file for complete search history.

(56) References Cited

U.S. PATENT DOCUMENTS

| | | | |
|---|---|---|---|
| 5,635,982 | A | 6/1997 | Zhang et al. |
| 5,708,767 | A | 1/1998 | Yeo et al. |
| 5,933,549 | A | 8/1999 | Ide et al. |
| 5,995,095 | A | 11/1999 | Ratakonda |
| 6,252,975 | B1 | 6/2001 | Bozdagi et al. |
| 6,320,669 | B1 | 11/2001 | Wess et al. |
| 6,340,971 | B1 | 1/2002 | Janse et al. |
| 6,342,904 | B1 | 1/2002 | Vasudevan et al. |
| 6,360,234 | B1 * | 3/2002 | Jain et al. ............. 715/500.1 |
| 6,738,100 | B1 * | 5/2004 | Hampapur et al. ......... 348/702 |

FOREIGN PATENT DOCUMENTS

| | | |
|---|---|---|
| EP | 1045316 | 10/2000 |
| WO | WO03096229 | 11/2003 |

OTHER PUBLICATIONS

Pfeiffer, S., et al., "Abstracting Digital Movies Automatically," Journal of Communication and Image Representation, vol. 7, No. 4, Dec. 1996, pp. 345-353.
Zhang, T., "Using Background Audio Change Detection for Segmenting Video,"PDNO 10018002-1.
Girgensohn, A., et al., "Time-Constrained Keyframe Selection Technique," IEEE, 1999, pp. 756-761.
Kim, J., "Efficient Camera Motion Characterization for MPEG Video Indexing," IEEE, 2000, pp. 1171-1174.

(Continued)

*Primary Examiner*—Cao (Kevin) Nguyen

(57) ABSTRACT

A system and method for merging scenes in a video sequence and constructing a keyframe to represent the underlying merged video content includes decomposing a video sequence into a series of component scenes, merging component scene pairs until a predetermined number of scene sets remain, extracting a keyframe from each scene set containing a single component scene, and constructing a new keyframe for each scene set containing a plurality of component scenes.

21 Claims, 4 Drawing Sheets

OTHER PUBLICATIONS

Wang, H., "A Highly Efficient System for Automatic Face Region Detection in MPEG Video," IEEE Transactions on Circuits and Systems for Video Technology, vol. 7, No. 4, Aug. 1997, pp. 615-628.

Uchihashi S et al: "Summarizing video using a shot importance measure and a frame-packing algorithm" Acoustics, Speech, and Signal Processing International Conference on Phoenix, AZ US Mar. 15-19, 1999, pp. 3041-3044.

* cited by examiner

SCALABLE VIDEO SUMMARIZATION

THE FIELD OF THE INVENTION

The present invention generally relates to summarizing of video material, and more particularly to automating and customizing the video summarizing process.

BACKGROUND OF THE INVENTION

Digital video is a rapidly growing element of the computer and telecommunication industries. Many companies, universities and even families already have large repositories of videos both in analog and digital formats. Examples include video used in broadcast news, training and education videos, security monitoring videos, and home videos. The fast evolution of digital video is changing the way many people capture and interact with multimedia, and in the process, it has brought about many new needs and applications.

One such application is video abstraction. Video abstraction, as the name implies, is a short summary of the content of a longer video sequence which provides users concise information about the content of the video sequence, while the essential message of the original is well preserved. Theoretically, a video abstract can be generated manually or automatically. However, due to the huge volumes of video data already in existence and the ever increasing amount of new video data being created, it is increasingly difficult to generate video abstracts manually. Thus, it is becoming more and more important to develop fully automated video analysis and processing tools so as to reduce the human involvement in the video abstraction process.

There are two fundamentally different kinds of video abstracts: still-image abstracts and moving-image abstracts. The still-image abstract, also called a video summary, is a small collection of salient images (known as keyframes) extracted or generated from the underlying video source. The moving-image abstract, also called video skimming, consists of a collection of image sequences, as well as the corresponding audio abstract extracted from the original sequence and is thus itself a video clip but of considerably shorter length. Generally, a video summary can be built much faster than the skimming, since only visual information will be utilized and no handling of audio or textual information is necessary. Consequently, a video summary can be displayed more easily since there are no timing or synchronization issues. Furthermore, the temporal order of all extracted representative frames can be displayed in a spatial order so that the users are able to grasp the video content more quickly. Finally, when needed, all extracted still images in a video summary may be printed out very easily.

While the use of video summarization is applicable to video sequences in any storage medium (tape, disc, etc.), one common storage medium of interest is DVD video discs. DVD video is dramatically changing the way people utilize multimedia information. The huge storage capacity of a DVD video disc provides an ideal storage place for still images, text, video and audio. The navigation features supported by DVD video format enable the interactive access of media contents. To accommodate the various media types that can be stored on DVD disc, there is an increasing need for a technology that can organize the media according to the DVD video format specifications and export such organized media content to the DVD disc. This technology is generally called "DVD authoring" and one essential task of DVD authoring is to create the DVD video title and navigation structure from the video source.

The DVD video title structure consists primarily of two entities, titles and chapters, which are used to organize the video content for interactive browsing. The format of a DVD disc allows the DVD disc to contain up to 99 titles, and a title may contain up to 99 chapters. The titles and chapters thus segment the entire video sequence into meaningful pieces with each title and/or chapter being an entry point for one particular piece of video.

To be able to automatically create the title-and-chapter structure from a video sequence is of great interest in DVD authoring. For example, in Hewlett Packard's MyDVD application, when a user elects to have a DVD created automatically from a video, a new chapter is created when a scene is detected based on a scene detection algorithm. A keyframe is then extracted from each detected scene. The keyframe, which represents the underlying scene, is linked to a DVD navigation button so that the user can browse the keyframes to quickly capture the content of the video sequence and click the relevant button to watch the corresponding scene.

Occasionally, the number of detected scenes may be larger than the number of chapters that is preferred or allowed. Therefore, a method for intelligently merging the detected scenes is needed. Further, if a chapter contains several original scenes which have been merged, a method for constructing a meaningful and informative keyframe to represent the underlying merged video content is needed.

SUMMARY OF THE INVENTION

A method and system for intelligently merging detected scenes in a video sequence and for constructing a keyframe to represent the underlying merged video content is described herein. In one embodiment according to the invention, a video sequence is decomposed into a series of component scenes, and then component scene pairs are merged until a predetermined number of scene sets remain. A keyframe is extracted from each scene set containing a single component scene, and a new keyframe is constructed for each scene set containing a plurality of component scenes.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

In the description of the invention herein, the issue of how to automatically create a DVD title-and-chapter structure (sometimes referred to herein as a video summary) from a video sequence is addressed. The description herein assumes that each video sequence is under one title, and focuses on how to create chapters to represent the scenes under that title. It is contemplated that a similar approach may be used to create multiple titles to represent the scenes in the video sequence, in which case the chapters could be used to subdivide each scene further. In addition, it is understood that the invention described herein is not limited to use with DVD authoring. Rather, the invention may be employed in any video abstraction where the number of detected scenes is larger than what is preferred or allowed, and merging of scenes is desired or required.

Figure 1:
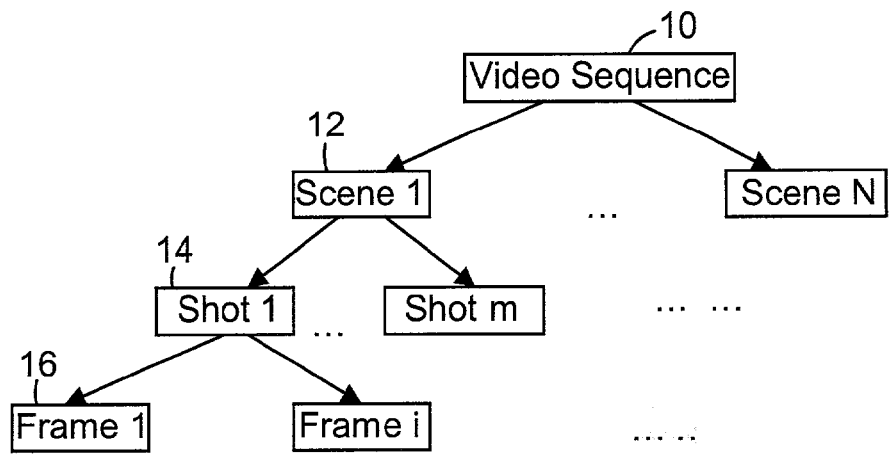
FIG. 1 is a schematic illustration of a hierarchical video structure.

Typically, as seen in FIG. 1, a video sequence 10 may be represented as a hierarchical tree based on a series of scenes 12, shots 14 and frames 16. As used herein, a shot 14 is defined as a video segment captured during a continuous shooting period and a scene 12 is composed of a set of semantically related shots 14. A shot 14 is composed of a series of individual frames 16. A variety of algorithms exist for shot and scene detection, any one of which may be suitable for use in decomposing a video sequence into its scene, shot and frame structure. Depending upon the type of video sequence 10 being analyzed, one algorithm may be preferred over another.

Figure 2:
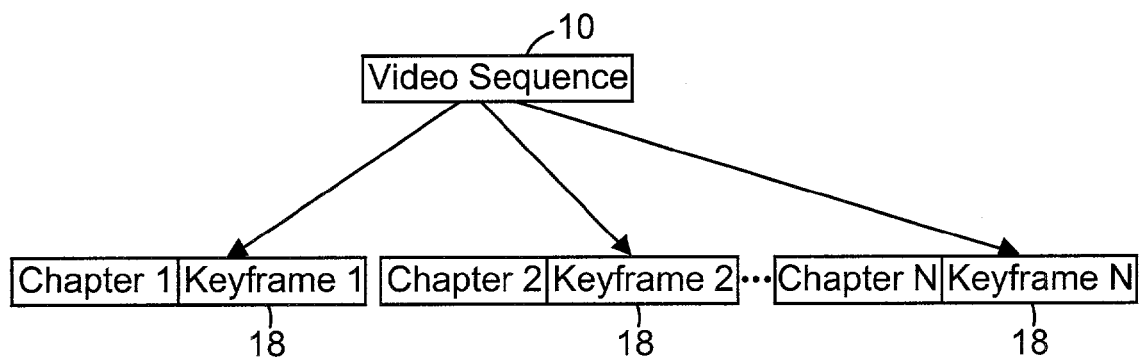
FIG. 2 is a schematic illustration of a DVD title and chapter structure.

In the context of a DVD disc, a scene 12 is considered as the basic semantic unit and is mapped to a chapter of the DVD disc. One or more keyframes 18 are extracted from each scene 12 by either uniform sampling or adaptive schemes that depend on the underlying video content complexity based on a variety of features. Thus, the video sequence 10 is summarized by representing each scene 12 (or chapter) with one keyframe 18, as shown in FIG. 2. When the number of scenes 12 (and thus extracted keyframes 18) exceeds a present limit, some scenes 12 must be merged until the number of scenes 12 falls within the preset limit.

Since different scenes 12 may have different visual impact on the viewer, each scene 12 is assigned an importance value. Various methods and algorithms are known for calculating importance values for scenes, shots and frames. For example, co-pending U.S. patent application Ser. No. 10/140,511, titled "Scalable Video Summarization and Navigation System and Method," filed on same date herewith and commonly assigned, is incorporated by reference and describes algorithms for calculating scene, shot and frame importance values. Importance value calculations may consider factors such as scene and shot length, activity levels of scenes and shots, the number of component shots contained in a scene, detected camera motion, the percentage of skin-colored pixels in a frame, the number of detected human faces in a frame, the distribution of edge energy in a frame, and the amount of motion activity contained in a frame.

For purposes of describing the invention herein, the scene structure defined below will be used throughout this description:

m_startFrame is the starting frame of the scene;
m_endFrame is the ending frame of the scene;
m_containedFrames[ ] is an array of frames contained in the scene;
m_keyframe is the representative frame extracted from the scene; and
m_import is the importance value of the scene.

As defined above, the value m_import is the importance of the scene. To ease the explanation of the algorithm, it may be assumed the keyframe has this importance value as well. However, it will be recognized that the frames of the video sequence may have their own calculated importance values which are used to select the keyframe 18 from all frames 16 in a scene 12.

Iterative Pair-wise Scene Merging

Figure 3:
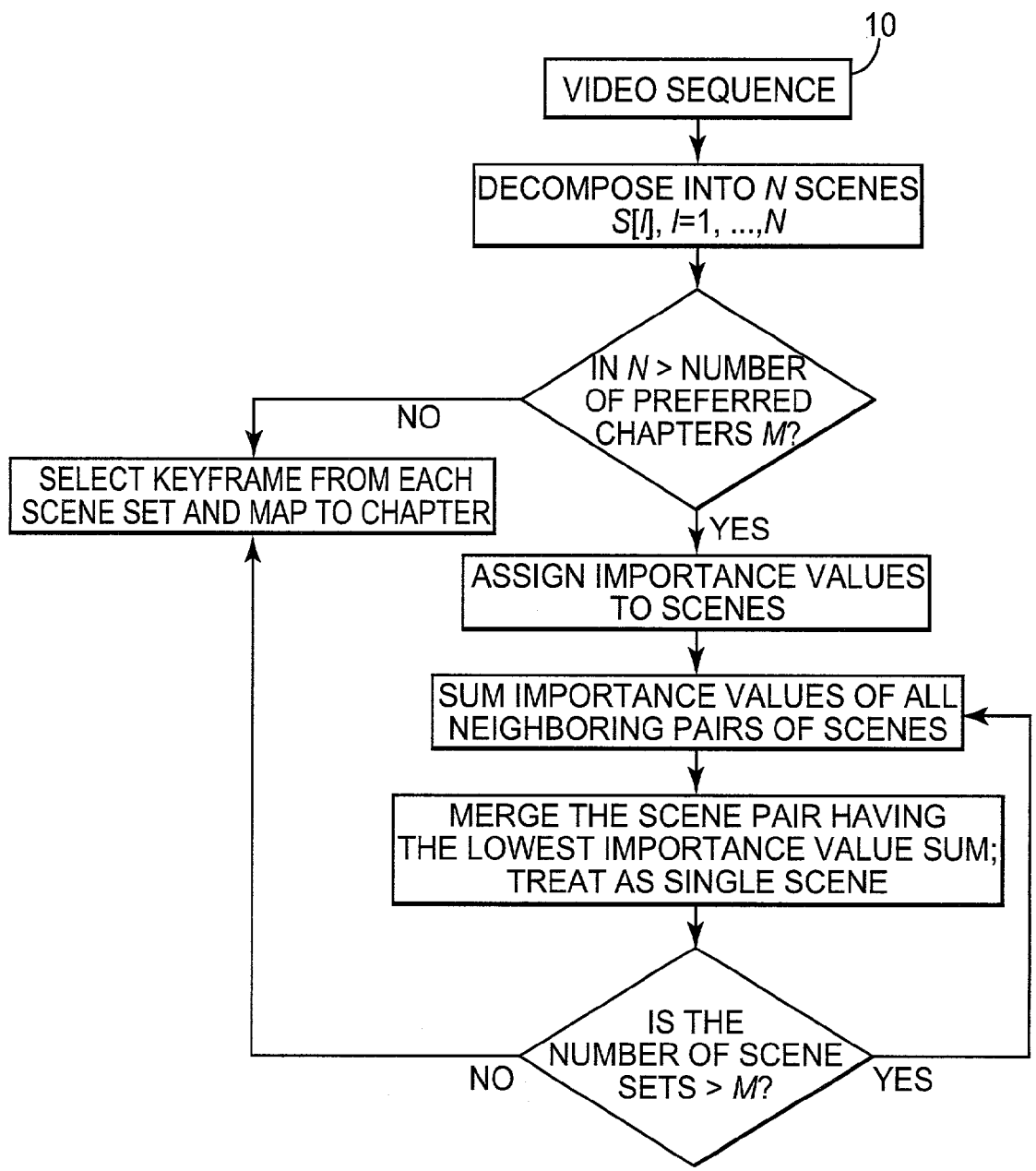
FIG. 3 is a flowchart illustrating iterative pair-wise scene merging according to the invention.

FIG. 3 shows an iterative pair-wise scene merging method according to the invention. Given a video sequence 10 that is decomposed into its component scenes, assume N scenes are detected and denoted as S[l], l=1, . . . , N, where each scene S[l] has the scene structure defined above. Further assume the number of preferred scenes (or chapters) is M and M<N. Then the following iterative pair-wise scene merging scheme may be used to create the M chapters.

The iterative pair-wise scene merging described herein is based on the scene importance values. The N scenes are iteratively merged until the number of resulting scenes 12 meets the preferred number of M chapters. Since each final scene may contain one or more original scenes, it is referred to herein as a scene set.

During each iteration, two neighboring scenes 12 are selected and merged. Hence, after each iteration, the number of scenes will be reduced by 1. The criterion for choosing which scenes 12 are merged is based on their importance values. Specifically, the pair of neighboring scenes 12 that gives the minimum summation of importance values will be merged.

For example, in the first iteration, all the neighboring pairs of scenes are {(S[1], S[2]), (S[2], S[3]), . . . , (S[N−1], S[N])}, which gives a total of N−1 pairs. The importance value for each pair is computed as $$I\_pair[i]=S[i].m\_import+S[i+1].m\_import, \text{ where } i=1,\ldots,N-1$$

The two adjacent scenes 12 that minimize I_pair[i] will be merged and considered as one single scene for the next iteration with its importance being the sum I_pair[i]. The iterative merging of adjacent scenes continues until, after N−M iterations of scene merging, there are M final scene sets. For each scene set containing only one scene, the scene is directly mapped to a chapter. However, for a scene set containing multiple scenes, a method to create a chapter from the scene set is needed.

Keyframe Resizing and Packing

Figure 4:
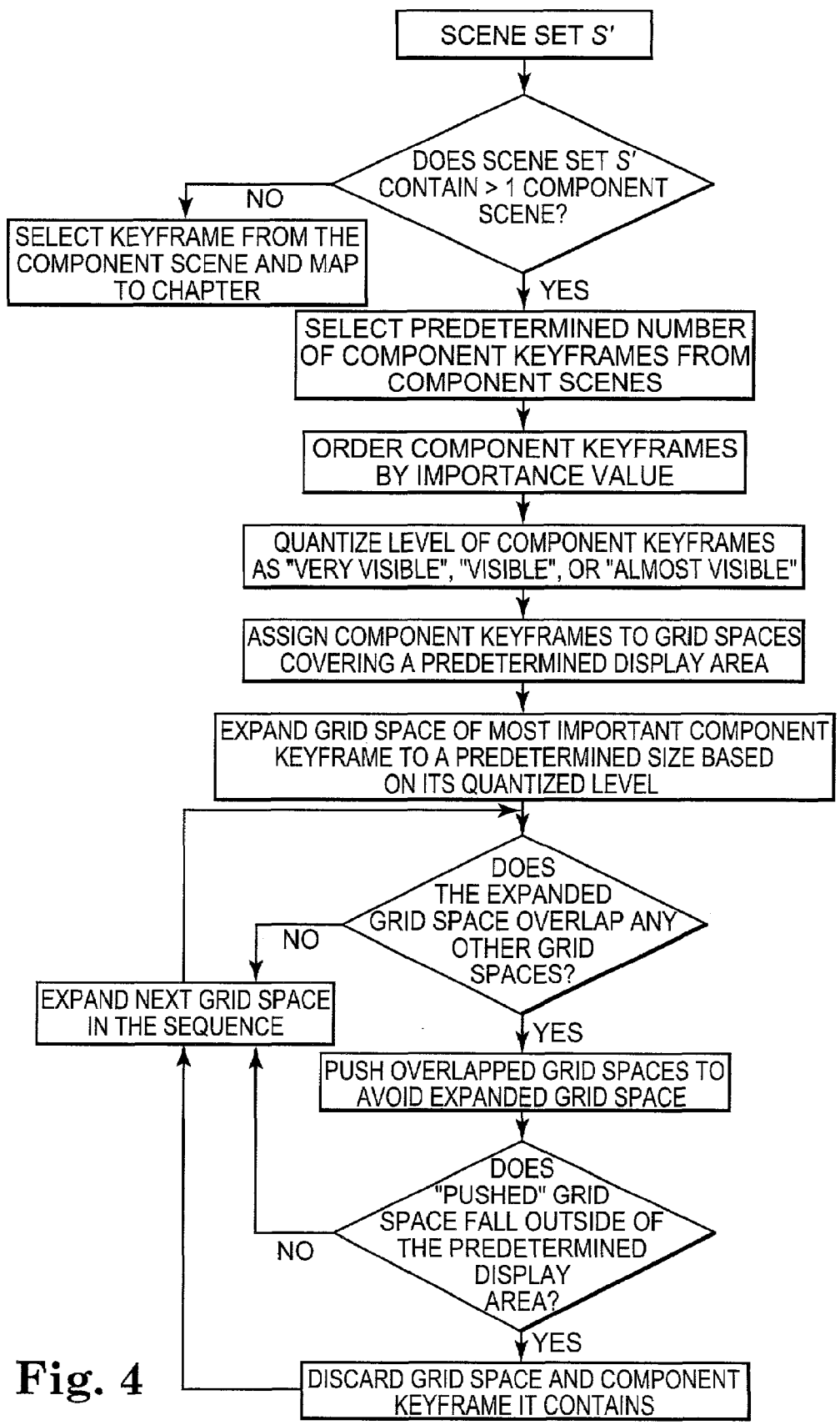
FIG. 4 is a flowchart illustrating keyframe resizing and packing according to the invention.

FIG. 4 illustrates a keyframe resizing and packing method according to the invention for use when a scene set S' contains multiple component scenes 12. Given a scene set S' containing m scenes from S[l] to S[l+m−1], the following formulas are used to update the information stored in the scene structure:

---

S'.m_startFrame = S[l].startFrame
S'.m_endFrame = S[l + m − 1].endFrame
S'.m_containedFrames[] = S[l].m_containedFrames[] ⊗ . . . ⊗ S[l + m − 1].m_containedFrames[], where ⊗ denotes the concatenation
S'.m_import = S[l].m_import + . . . + S[l + m − 1].m_import The final operation is the update of the keyframe 18 that is desired to represent all of the scenes contained in the scene set S'. One solution is to extract the keyframe 18 of the most important scene in the scene set. However, this solution results in the loss of information from other component scenes 12 in scene set S'. A better solution would be to include as much information as possible from all of the component scenes in the scene set. To achieve this objective, a keyframe resizing and packing scheme is used to construct a new keyframe 18 for the scene set S'.

The keyframe resizing and packing method described herein resizes all keyframes 18 of scenes S[l], S[l+1], ..., S[l+m−1] based on their importance values and packs them into a pre-assigned display area. A keyframe 18 with a larger importance value is assumed to better represent the underlying video content than a keyframe with a smaller importance value. Thus, the keyframe 18 having a higher importance value is assigned a larger display size to provide the viewer a better understanding of the video sequence.

Strategies have been investigated to resize and pack multiple frames. However, the existing methods are inappropriate for the creation of DVD chapters. In particular, one approach is an automatic resizing and packing algorithm which forces all extracted keyframes to be resized and packed into the display area. (See S. Uchihashi and J. Foote, "Summarizing Video Using a Shot Importance Measure and a Frame-Packing Algorithm", ICASSP'99, vol. 6, 1999). This method may reduce the size of the component keyframes to the extent they are no longer clearly recognizable. Meanwhile, for those keyframes that are relatively less important, it is not worthwhile to make room for them at the price of making the more important keyframes unrecognizably small. In another approach, several templates are provided to pack the extracted keyframes into pre-assigned display areas based on their respective importance values. (See M. M. Yeung and B. L. Yeo, "Video Visualization For Compact Presentation and Fast Browsing of Pictorial Content", IEEE Transactions on Circuits and Systems for Video Technology, vol. 7, no. 5, October 1997). However, all of the template layouts in this approach are fixed and cannot be adjusted to fit the underlying scene structure.

According to the present invention, a resizing and packing method is described that can adaptively pack the keyframes 18 of a scene set S', while assuring the visibility of the most important keyframes 18.

The keyframe resizing and packing method is based on the following two premises. The first premise is that not all of the component keyframes in a scene set S' need to be included in the finally constructed keyframe. In the description herein, it is assumed that at most nine keyframes, corresponding to the nine most important component keyframes, will be considered. Of course, any other number of component keyframes could be considered using the method described herein, and the assumed number of nine component keyframes is used for illustrative purposes only and is not to be considered limiting on the invention.

The second premise is that the selected component keyframes will be quantized into one of three visibility levels based on their importance values, with each visibility level being assigned a pre-specified display size. The display size of every component keyframe in the first level should be "very visible", while that of the second level will be "visible" and "almost visible" for the third level. Greater or fewer levels may be used if desired, and the use of three levels is exemplary only. The distinction in size between "very visible", "visible" and "almost visible" display areas may be determined empirically. For example, for purposes of the description herein the "visible" display size is assigned to be 75% of the "very visible" display size, and the "almost visible" area is assigned to be 50% of the "very visible" display size. The size of the pre-specified display areas will depend on the expected display device. For example, on a laptop computer, a "very visible" display area may be approximately a 1 inch square, while for a large screen television set the "very visible" display area may be approximately a 3 inch square or larger.

Figure 5:
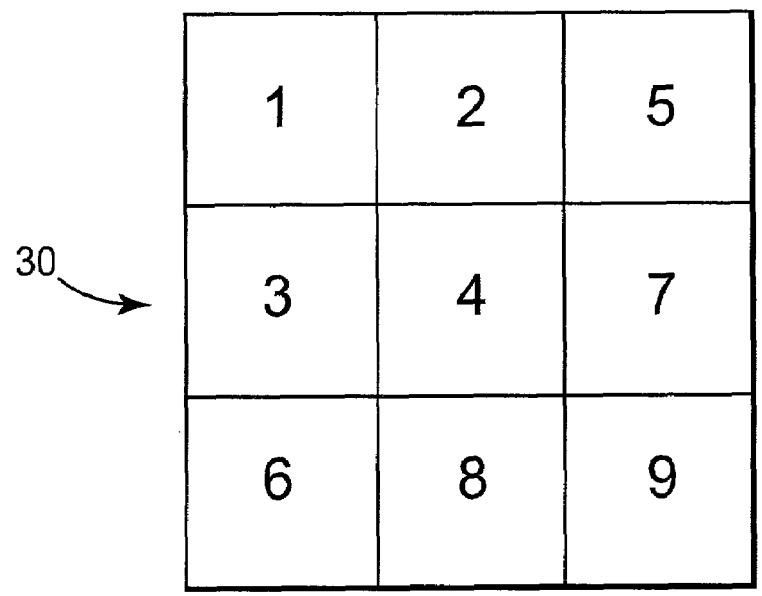
FIG. 5 is one possible grid used for constructing a new keyframe according to the invention.

The following three steps are employed in the resizing and packing process. First, the selected component keyframes (nine component keyframes in this example) are denoted as s1, s2, ... s9, sorted by their importance values in deceasing order. Second, the display area 30 for the constructed keyframe is divided into a 3 by 3 grid and the nine component keyframes are assigned to the grid spaces according to the order shown in FIG. 5. In the event that less than nine keyframes are returned, the unoccupied grid spaces are left empty. Third, the component keyframes are expanded to their expected display size (i.e., "very visible", "visible" or "almost visible") in the order of their importance. In particular, based on each component keyframe's quantized level, "very visible", "visible" or "almost visible", the area of its grid space is expanded to the pre-assigned size. If the expanded grid space overlaps one of the neighboring grid spaces, the overlapped grid space is "pushed" aside to avoid the expanded grid space. If a grid space is finally pushed out of the display area 30 for the constructed keyframe, that grid space and the component keyframe it contains is simply discarded. The grid space numbering as shown in FIG. 3 results in the least important component keyframes 18 being pushed out of the display area 30 of the constructed keyframe 18 first, while the most important component keyframes 18 are preserved in the constructed keyframe 18. Moreover, if there are some areas left blank in the display area 30 after the expansion process, the sizes of the component keyframes 18 are adjusted based on their importance values to fill the entire display area 30. Using this scheme, the most important component keyframes 18 in a scene set S' will always be kept in the display area 30 of the constructed keyframe 18 with a higher visibility.

The invention described herein thus automatically and intelligently creates a video summary with meaningful DVD entities (titles and chapters) which consider the dynamics of the video sequence and represent its underlying content well. The invention provides a desired number of chapters and constructs a meaningful representative keyframe for each chapter.

Figure 6:
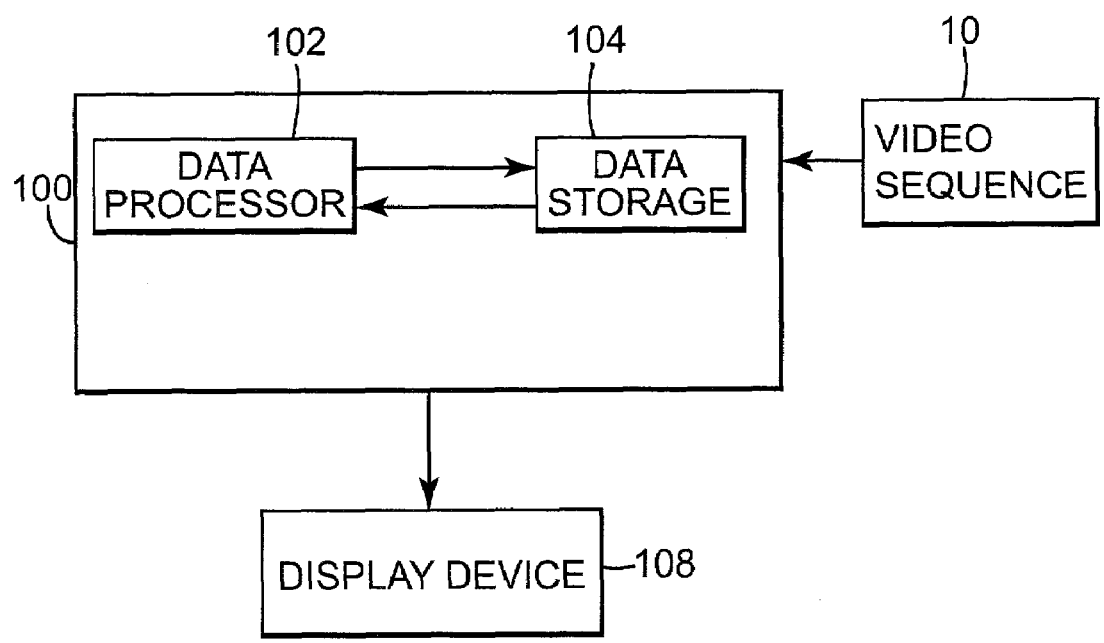
FIG. 6 is a schematic representation of a computer system usable to create a video summary according to the invention.

As schematically illustrated in FIG. 6, the system described herein may be implemented on a variety of computing platforms, such as a home computer 100, so long as the chosen platform possesses a processor 102 with sufficient computing power, a data storage system 104 for storing the video sequence 10, algorithms and video summary, and a display device 108 for allowing the user to view the video summary. The data storage system 104 may be a DVD disc, a hard disc drive or other persistent storage device, or the random access memory of the chosen platform. The display device 108 may be, for example, a video monitor or a hard copy generated by a printer.

Although specific embodiments have been illustrated and described herein for purposes of description of the preferred embodiment, it will be appreciated by those of ordinary skill in the art that a wide variety of alternate and/or equivalent implementations may be substituted for the specific embodiments shown and described without departing from the scope of the present invention. Those with skill in the computer and electrical arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A method for summarizing a video sequence comprising the steps of:
    decomposing a video sequence into a series of component scenes;
    merging component scene pairs until a predetermined number of scene sets remain;
    extracting a keyframe from each scene set containing a single component scene; and
    constructing a new keyframe for each scene set containing a plurality of component scenes.

2. The method of claim 1, further comprising the step of assigning an importance value to each of the component scenes.

3. The method of claim 2, wherein merging component scene pairs includes the steps of:
    summing the importance values of all adjacent component scene pairs;
    comparing the sums of all adjacent component scene pair importance values; and
    merging a component scene pair having the lowest importance value sum.

4. The method of claim 3, further including the step of iteratively summing the importance values of all adjacent component scene pairs and merging the component scene pair having the lowest importance value sum until the predetermined number of scene sets remain.

5. The method of claim 1, wherein constructing a new keyframe for each scene set containing a plurality of component scenes includes the steps of:
    selecting a predetermined number of component keyframes from the component scenes; and
    positioning and resizing the component keyframes within a predetermined new keyframe display area based upon the component keyframe importance values.

6. The method of claim 5, wherein positioning and resizing the component keyframes includes the steps of:
    assigning the component keyframes to grid spaces covering the predetermined new keyframe display area; and
    expanding the grid spaces to a predetermined size based on the importance value of the assigned component keyframe.

7. The method of claim 6, wherein expanding the grid spaces to a predetermined size includes the steps of:
    pushing unexpanded grid spaces to avoid expanded grid spaces; and
    discarding grid spaces that are pushed outside the predetermined new keyframe display area.

8. The method of claim 1, wherein constructing a new keyframe for each scene set containing a plurality of component scenes includes the steps of:
    selecting a predetermined number of component keyframes from the component scenes in the scene set;
    ordering the component keyframes by their importance values;
    quantizing each of the component keyframes into one of a plurality of predefined visibility levels;
    assigning the component keyframes to grid spaces covering a predetermined new keyframe display area;
    sequentially expanding the grid spaces to a predetermined size based on the visibility level of the assigned component keyframe;
    moving unexpanded grid spaces to avoid expanded grid spaces; and
    discarding grid spaces that are moved outside the predetermined new keyframe display area.

9. The method of claim 8, wherein nine component keyframes are selected from the component scenes.

10. The method of claim 8, wherein each of the component keyframes are quantized into one of three visibility levels.

11. The method of claim 8, wherein the plurality of visibility levels each have an associated display size, and wherein the largest display size is at least twice as large as the smallest display size.

12. A method to construct a new keyframe comprising the steps of:
    selecting a predetermined number of component keyframes from a video sequence;
    quantizing each of the component keyframes into one of a plurality of predefined visibility levels;
    assigning the component keyframes to grid spaces covering a predetermined new keyframe display area;
    sequentially expanding the grid spaces to a predetermined size based on the visibility level of the assigned component keyframe;
    pushing unexpanded grid spaces to avoid expanded grid spaces;
    discarding grid spaces that are pushed outside the predetermined new keyframe display area.

13. The method of claim 12, further comprising the step of assigning an importance value to each of the component keyframes.

14. The method of claim 13, wherein assigning the component keyframes to grid spaces includes the step of positioning the component keyframes on the grid spaces such that the least important component keyframes are the first to be pushed out of the predetermined new keyframe display area.

15. The method of claim 12, wherein the plurality of visibility levels each have an associated display size, and wherein the largest display size is at least twice as large as the smallest display size.

16. A method for creating a DVD title-and-chapter structure from a video sequence comprising the steps of:
    decomposing a video sequence into a series of component scenes;
    iteratively merging component scene pairs until a predetermined number of scene sets remain;
    constructing a new keyframe for each scene set having a plurality of component scenes, wherein constructing a new keyframe includes the steps of:
        selecting a plurality of component keyframes from the scene set;
        quantizing each of the plurality of component keyframes into one of a plurality of visibility levels;
        assigning the component keyframes to grid spaces covering a new keyframe display area; and
        sequentially expanding the grid spaces based on the visibility level of the assigned component keyframe.

17. The method of claim 16, further comprising the step of extracting a keyframe from each scene set having only one component scene.

18. The method of claim 16, wherein constructing a new keyframe further includes the steps of:

moving unexpanded grid spaces to avoid expanded grid spaces; and discarding grid spaces that are moved outside the predetermined new keyframe display area.

19. The method of claim 16, wherein the predetermined number of scene sets is less than 100.

20. The method of claim 16, wherein assigning the component keyframes to grid spaces covering a new keyframe display area includes the step of positioning the component keyframes on the grid spaces such that the least important component keyframes are the first to be moved out of the predetermined new keyframe display area.

21. A computer readable medium containing instructions for controlling a computer system to perform a method for constructing a keyframe from a scene set comprising the steps of:

selecting a predetermined number of component keyframes from the scene set;

quantizing each of the component keyframes into one of a plurality of predefined visibility levels;

assigning the component keyframes to grid spaces covering a predetermined display area;

sequentially expanding the grid spaces to a predetermined display size based on the visibility level of the assigned component keyframe; and discarding grid spaces that are expanded outside the predetermined display area.

* * * * *